Feb. 9, 1965 R. G. ENGMAN ETAL 3,169,232
CONTROLLED RECTIFIER CIRCUIT
Filed June 3, 1960

INVENTORS
ROBERT G. ENGMAN
HOWARD W. COLLINS
BY Elliott & Pastoriza
ATTORNEYS

United States Patent Office 3,169,232
Patented Feb. 9, 1965

3,169,232
CONTROLLED RECTIFIER CIRCUIT
Robert G. Engman, Los Alamitos, and Howard W. Collins, Long Beach, Calif., assignors to Crydom Laboratories, Incorporated, a corporation of California
Filed June 3, 1960, Ser. No. 33,805
1 Claim. (Cl. 332—9)

This invention relates to electrical control circuits and more particularly to a D.-C. controlled recttifier circuit for controlling relatively large D.-C. power output from D.-C. sources to drive heavy-duty electrical equipment and other D.-C. loads.

A variable source of D.-C. power for controlling electrical equipment such as motors, for example, is an important requirement, particularly for speed control. In the case of electrically driven vehicles, the speed of the vehicle is usually controlled by the power input to the driving motor. This control has been accomplished in the past by employing a large voltage dropping resistance in the form of a variable rheostat in series with the power source and motor or load.

While the desired degree of motor control is achieved by the use of rheostats, there results at low speeds a considerable power loss, principally dissipated as heat in the rheostate itself. Thus, when the vehicle is starting or stopping or traveling at slow speeds, its efficiency is greatly reduced.

Controlled rectifiers heretofore have generally been thyratron-like devices in which once fired, they remain in conduction. Thus, they are most useful in an A.-C. circuit where there is a continuous reversal of voltage to turn them off. To use such controlled rectifiers to provide a variable D.-C. power output from a D.-C. power source accordingly has heretofore required relatively complicated circuitry to effect conversion to A.-C. and reconversion to D.-C. output.

With the foregoing in mind, it is a primary object of this invention to provide a novel D.-C. controlled rectifier circuit which will provide a controlled D.-C. output power from a D.-C. source.

More particularly, it is an object to provide a circuit of the above type in which such control of the average D.-C. power output may be continuously varied from zero up to maximum power available without any substantial power losses in the circuit itself.

Another object is to provide a D.-C. controlled rectifier circuit in which the average D.-C. power output may be varied by a control means energized by low voltage to the end that the equipment is considerably simplified with the attendant advantage of low manufacturing cost and increased reliability as compared to present-day devices capable of achieving analogous results.

Still another important object is to provide a control meeting the foregoing objects which is substantially independent of the load applied to the device.

Briefly, these and many other objects and advantages of this invention are attained by providing a controlled rectifier means for connection between a D.-C. input source such as a series of storage batteries and a suitable output from which variable D.-C. power is derived for driving any suitable electrical piece of equipment such as a vehicle motor. In combination with the controlled rectifier means, there is provided an "off" control means for terminating conduction of the controlled rectifier means at the end of given constant time intervals. Also provided is an "on" control means at points spaced a given point in time, respectively, ahead of the end of the constant intervals. These "off" and "on" control means in turn are energized from a simple low-voltage self-contained auxiliary A.-C. source.

The "on" control means includes additional control means for varying the point in time of initiation of the conduction of the controlled rectifier so that the D.-C. power output is in the form of a series of square wave pulses of frequency corresponding to the frequency of the constant intervals. The average power is controlled by modulating the pulse width of the square wave or pulses. Thus, by controlling the initiation points of conduction of the power rectifier means by moving them, in time, closer or farther from the termination of conduction points as occur at the ends of the constant time intervals, the average output power is correspondingly and proportionately varied. This variation may extend from zero power output to maximum power output. At maximum power output, the initiation of conduction of the controlled rectifier would substantially correspond with the termination of conduction thereof.

There is thus provided a D.-C. power output control which may be effected substantially independent of the load connected to the power output and also effected with substantially no power loss within the circuit itself. Further, the circuit provides a positive means of turn-off of controlled rectifiers operating from D.-C. sources and thus allows the generally recognized advantageous characteristics of controlled rectifiers to be realized in D.-C. circuitry.

A better understanding of the control circuit of this invention as well as various further features and advantages, will be had by referring to one embodiment thereof as illustrated in the accompanying drawings, in which.

Figure 1:
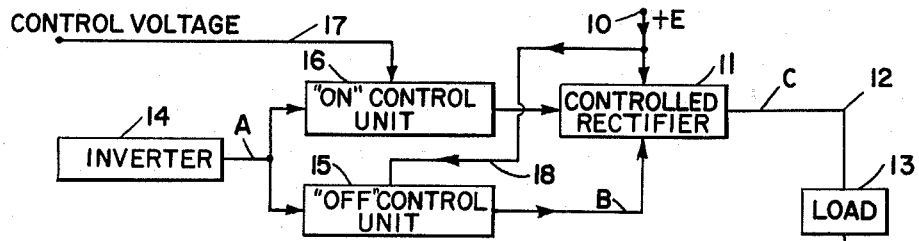
FIGURE 1 is a simplified schematic block diagram illustrating the basic components of the D.-C. controlled rectifier circuit.

Referring first to the upper right-hand portion of FIGURE 1, there is shown an input lead 10 to which an input source of constant D.-C. energy is connected. This source is designated +E and may, for example, constitute the output from a series of storage batteries.

The D.-C. energy applied to the input 10 passes to the input of a controlled rectifier means 11 and thence through an output lead 12 to a load 13. In the absence of a control means, the controlled rectifier will block the D.-C. voltage, and there will be no output. On the other hand, if the rectifier is fired, it will remain in continuous conduction.

In accordance with the present invention, a control system is provided in combination with the controlled rectifier means 11 for enabling a variation of the average D.-C. output power appearing at the output lead 12. As shown in FIGURE 1, this control system includes an auxiliary A.-C. power source in the form of an inverter 14 for energizing an "off" control unit 15 and an "on" control unit 16. The output from the "off" control unit 15 passes to the controlled rectifier means 11 and is connected to terminate conduction of the controlled rectifier at the end of constant time intervals corresponding to the end of each half cycle of the auxiliary A.-C. power source from the inverter 14.

The "on" control unit is connected to the controlled rectifier means 11 for initiating conduction of the controlled rectifier at points in time which may be shifted with respect to the termination of conduction points to provide at the output 12 a series of D.-C. square wave pulses, the widths of which may be varied. The point in time at which the "on" control unit initiates conduction of the controlled rectifier in turn is controlled by suitable means within the "on" control unit circuit. To this end, a lead 17 is provided for passing a D.-C. signal from an appropriate low power control source to provide control voltage to the unit 16. The "off" control unit is energized from a branch lead 18 passing from the voltage source E as shown.

Figure 2:
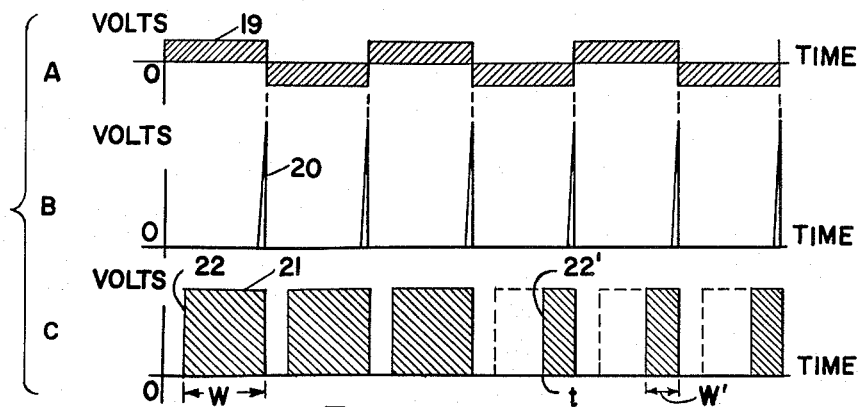
FIGURE 2 illustrates a series of wave forms useful in explaining the operation of the components in FIGURE 1.

FIGURE 2 schematically depicts a series of wave forms A, B, and C corresponding to the wave forms as would appear at the output points A, B, and C of the inverter, "off" control unit, and controlled rectifier as designated in FIGURE 1. Thus, the auxiliary A.-C. power source 14 provides a low power square wave output 19 as shown at A in FIGURE 2. The output from the "off" control unit 15 in turn includes pulse generating equipment for providing a series of positive voltage spikes 20 as shown at B corresponding in time to the termination of each half cycle of the auxiliary power source square wave 19.

The output D.-C. power appearing on the output lead 12 is shown at graph C and as noted takes the form of a series of D.-C. square wave pulses 21. These pulses are a consequence of pre-determined effecting of conduction and non-conduction of the controlled rectifier 11. As shown, the trailing edges of the pulse 21 correspond to the positive voltage spikes 20 of B and the rectifier is effectively rendered non-conducting by each of these voltage spikes at fixed intervals of time. Conduction of the controlled rectifier 11 on the other hand is initiated by the "on" control unit 16 as described. The particular point in time at which conduction is initiated corresponds to the leading edge 22 of the pulse 21. This point in time, $t$, may be varied as described so that by moving the point closer to the trailing edge, the width, W, of the pulses may be decreased as indicated at W' for the last three square wave pulses in C of FIGURE 2. The new position of the leading edge is indicated at 22'.

The average output power for the narrower width pulses shown to the right in FIGURE 2 is clearly less than for the wider width pulses. Thus, a very fine degree of power output control can be achieved by modulating the pulse width of the output pulses from zero, in which no power output is provided, to a maximum, in which the square waves appearing in FIGURE 2 are substantially continuous and would appear as a continuous D.-C. output.

Figure 3:
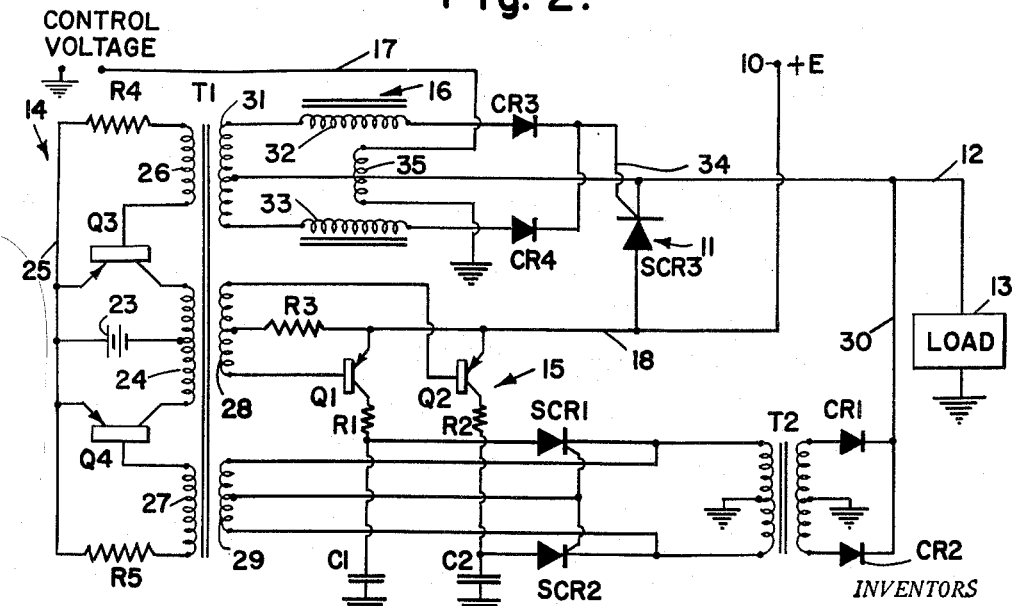
FIGURE 3 is a detailed circuit diagram illustrating electrical elements for performing the various functions depicted by the blocks of FIGURE 1.

One type of circuit for achieving the foregoing functions of the various blocks illustrated in FIGURE 1 is shown in FIGURE 3. Thus, the inverter 14 to the left of FIGURE 3, may include an input voltage source in the form of a battery 23 having its negative side connected to the center tap of a split primary winding 24 of a saturable core transformer $T_1$, and its positive side connected to a common lead 25. The outer ends of the split primary connect to the collector terminals respectively of switching transistors $Q_3$ and $Q_4$. The emitter terminals are tied to the common line 25 which connects through resistances $R_4$ and $R_5$ to feedback windings 26 and 27 respectively. The other ends of the feedback windings connect to the base terminals of the transistors $Q_3$ and $Q_4$ as shown.

The "off" control unit 15 as illustrated in detail in FIGURE 3 includes a secondary winding 28 for passing the square wave output from the inverter to the bases respectively of first and second switching transistors $Q_1$ and $Q_2$. The emitter terminals of these transistors are supplied with the constant voltage source +E at the terminal 10 through the branch lead 18 as shown. The collector terminals connect through resistances $R_1$ and $R_2$ to storage condensers $C_1$ and $C_2$ respectively. Voltages which build up across the condenser $C_1$ and $C_2$ are transferred through controlled rectifiers $SCR_1$ and $SCR_2$, respectively, to opposite sides of a split primary winding of a step-up pulse transformer $T_2$. The secondary of the transformer $T_2$ includes a grounded center tap as shown and diodes $CR_1$ and $CR_2$ connected to a common output lead 30 passing upwardly to the output side 12 of the controlled rectifier 11.

In the operation of the "off" control unit, the transistors $Q_1$ and $Q_2$ are switched to the saturation state on alternate half cycles of the square wave output voltage from the inverter 14. The condensers $C_1$ and $C_2$ are thus charged through the resistances $R_1$ and $R_2$ to +E volts on alternate half cycles.

The rectifier $SCR_1$ is fired during the half cycle that $C_2$ is being charged. The rectifier $SCR_2$ is fired during the half cycle that $C_1$ is being charged. $C_1$ and $C_2$ are then alternately discharged into the primary of the pulse transformer $T_2$, these discharges providing relatively large positive voltage pulses or spikes at the secondary. The diodes $CR_1$ and $CR_2$ insure that the output voltage pulses on the line 30 are of consistent polarity. By providing a step-up ratio in the pulse transformer $T_2$, the output pulses on the line 30 may be of considerably higher voltage than the input voltage source to which the condensers $C_1$ and $C_2$ are charged.

There are thus provided positive voltage spikes as described in connection with graph B at 20 corresponding in time to the trailing edge of each half cycle of the A.-C. power source wave form 19 from the inverter 14.

As shown in FIGURE 3, the output line 30 carrying the positive voltage spike 20 in FIGURE 2 connects to the output side of the controlled rectifier 11 also designated $SCR_3$. The input to this controlled rectifier is connected directly to the input source 10 to receive the +E voltage. The rectifier $SCR_3$ is normally in a conducting state so that the +E voltage will appear at the load 13, but each time a positive voltage spike 20 is received on the output lead 12, the controlled rectifier will be rendered non-conductive since this voltage is higher than the +E voltage.

Initiation of conduction of the controlled rectifier 11, as explained in connection with FIGURE 1, is achieved by the "on" control unit. As shown in FIGURE 3, this circuit includes a secondary winding 31, receiving the A.-C. square wave output from the inverter 14, and center tapped by the output lead 12. The outer ends of the secondary winding 31 connect through first and second magnetic reactors 32 and 33, and diodes $CR_3$ and $CR_4$, respectively, to a common lead 34 connected to the output side of the controlled rectifier $SCR_3$.

The saturable reactors 32 and 33 operate essentially as switches for alternately passing through their output diodes the square wave output voltage from the inverter 14 induced in the secondary winding 31. The voltage appearing on the lead 34 would thus constitute a rectified voltage from the output of the inverter in the absence of any further control.

The "on" control unit however further includes means for controlling the switching points of the reactors 32 and 33. This is accomplished by a current control coil 35 energized through lead 17 by any suitable low power signal. This signal may be derived from a variable resistance connected to the D.-C. power source +E if desired. The magnitude of the current in the coil 35 will control the degree of saturation of the reactors 32 and 33 and thus control the point in time at which full saturation and switching will occur. The result is that the application of an "on" signal at the output 34 to the power rectifier 11 is controlled in time so that the point in time when the rectifier 11 is rendered conductive may be controlled. As described in connection with FIGURES 1 and 2, this point in time at which conduction is initiated is defined by the leading edges 22 and 22' of the various square pulses depicted at C in FIGURE 2.

Thus, the small D.-C. control current passed into the coil 35 enables width modulation of the output to be effected by varying the time during each half cycle that the controlled rectifier $SCR_3$ is conductive. As described heretofore, $SCR_3$ is turned off every half cycle by the voltage spikes provided from the pulse transformer $T_2$.

The controlled rectifiers $SCR_1$ and $SCR_2$ associated with the "off" control unit turn off because of the decay of the current in condensers $C_1$ and $C_2$ when discharged into the law saturated impedance of the pulse transformer $T_2$.

From the foregoing description, it will thus be evident that a very accurate degree of continuous control of the average power output is realizable. Moreover, there is no inefficiency or power loss from heat dissipation as characterizes circuits employing voltage dropping resistances for varying power output. Finally, it should be noted that the controlled rectifiers $SCR_1$ and $SCR_2$ as well as the pulse transformers and diodes $CR_1$ and $CR_2$ handle only a small amount of average power so that there is no appreciable loss of power from the input source $+E$ for the control purposes described.

While the invention has been described in connection with providing a controlled D.-C. output, the principles are clearly applicable to the provision of efficient high power amplifiers operating from a D.-C. source. Also, the invention is useful for simply converting D.-C. power of one voltage level to D.-C. power at another voltage level.

Various modifications and equivalent circuits falling with the scope and spirit of the present invention will thus occur to those skilled in the art. The controlled D.-C. rectifier circuit is therefore not to be thought of as limited to the specific embodiment set forth merely for illustrative purposes.

What is claimed is:

A controlled rectifier circuit having an input lead for connection to a D.-C. source and an output lead providing controlled D.-C. output power in accordance with said D.-C. source, comprising, in combination: a controlled rectifier means connected between said input lead and output lead; an auxiliary A.-C. power source; an "off" control means connected between said A.-C. power source and said controlled rectifer means for reversing the voltage across said controlled rectifier means thereby terminating passing of power through said controlled rectifier means at the end of each half cycle of said A.-C. power; and an "on" control means connected between said A.-C. source and said controlled rectifier means for initiating the passing of power through said controlled rectifier means at a point in time between the beginning of each half cycle of said A.-C. power and said end of each half cycle, said "on" control means including first and second switching means for initiating conduction of said controlled rectifier means to provide D.-C. pulses, said first and second switching means comprising magnetic reactors and a variable current carrying coil in flux coupling relationship with said reactors and connected to said D.-C. source for varying the point in time at which saturation switching of said reactors takes place whereby the leading edges of said D.-C. pulses are variable in time so that output power pulses are provided having pulse widths which are modulated by said D.-C. source to vary the average value of said controlled D.-C. output power on said output lead.

References Cited in the file of this patent
UNITED STATES PATENTS

| | | |
|---|---|---|
| 2,740,086 | Evans et al. | Mar. 27, 1956 |
| 2,798,970 | Hall et al. | July 9, 1957 |
| 2,874,355 | Hernqvist | Feb. 17, 1959 |
| 2,947,950 | Pinckaers | Aug. 2, 1960 |
| 2,962,602 | Decker et al. | Nov. 29, 1960 |